(12) United States Patent
Chen et al.

(10) Patent No.: US 7,568,567 B2
(45) Date of Patent: Aug. 4, 2009

(54) SNAP-RING WITH ADDITIONAL LOOP

(75) Inventors: Joseph Young-Long Chen, Ann Arbor, MI (US); Leonid Basin, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 395 days.

(21) Appl. No.: 11/461,820

(22) Filed: Aug. 2, 2006

(65) Prior Publication Data

US 2008/0029363 A1 Feb. 7, 2008

(51) Int. Cl.
*F16B 21/18* (2006.01)
*F16D 13/58* (2006.01)

(52) U.S. Cl. ............... 192/30 R; 411/517; 403/DIG. 7

(58) Field of Classification Search ............. 411/517, 411/518, 530; 403/DIG. 7
See application file for complete search history.

(56) References Cited

U.S. PATENT DOCUMENTS

| | | | | |
|---|---|---|---|---|
| 2,749,162 A | * | 6/1956 | Humphrey | 411/517 |
| 2,803,416 A | * | 8/1957 | Berlien | 411/517 |
| 3,314,696 A | * | 4/1967 | Ferguson et al. | 285/321 |
| 3,401,436 A | * | 9/1968 | Bradshaw | 411/518 |
| 4,568,059 A | * | 2/1986 | Kawase et al. | 411/518 |
| 4,640,534 A | * | 2/1987 | Hoskins et al. | 285/321 |
| 6,186,180 B1 | * | 2/2001 | Moller et al. | 285/351 |
| 2005/0072197 A1 | * | 4/2005 | Evans et al. | 70/375 |

FOREIGN PATENT DOCUMENTS

GB 2 182 111 A * 5/1987

* cited by examiner

*Primary Examiner*—Rodney H Bonck

(57) ABSTRACT

A retaining device or snap-ring for retaining a mating hub and drum within a transmission is provided. The device is insertable into a groove along the inner circumference of a circular flange and includes a main outer loop, an opening for dividing the snap-ring into two deflectable curvilinear portions and at least partially defined by a tabular extension projecting from each curvilinear member. The tabular extensions provide sufficient surface area for applying deflective or compressive force to the snap-ring and are contoured to facilitate use of a deflection tool. The snap-ring further comprises an externally-projecting secondary loop for reducing deflection force, or an internally-projecting secondary loop for increasing deflection force. The snap-ring may be used within a double-flange hub having a plurality of slots for facilitating insertion of the secondary loop and the tabular extensions within the flange groove.

7 Claims, 2 Drawing Sheets

SNAP-RING WITH ADDITIONAL LOOP

TECHNICAL FIELD

The present invention relates to an improved snap-ring retaining device for use within a vehicle transmission.

BACKGROUND OF THE INVENTION

A circlip or snap-ring is a substantially circular or annular retaining device having a break or opening which divides the ring into two interconnected curvilinear members. The members may be deflected or flexed to facilitate insertion into a mating groove. Snap-rings are typically formed, stamped, or otherwise constructed from a relatively thin layer of metal which directs a retaining or clamping force along the circumference or periphery of the snap-clip when properly inserted into the groove. The directional force is most commonly used to retain or clamp together various mating components.

The force vector imparted by the snap-ring varies with the type or style of snap-ring that is used and the location of the ring relative to the parts retained or mated. Two main styles of snap-ring are available: an internal snap-ring positioned within a mating internal groove and used for applying outwardly-directed clamping force, and an outer snap-ring positioned within a mating external groove for applying inwardly-directed clamping force. Of these two main types of snap-ring, internal snap-rings are of particular beneficial use within an automatic vehicle transmission.

With an internal snap-ring, the ring is compressed or contracted by deflecting the curvilinear beams or members of the ring and then inserted or "snapped" into a continuous groove cut into an inner circumferential surface of a drum, shaft, cylinder, or other component having an approximately circular cross section. Once inserted into the groove, the snap-ring is then released or retracted into its installed position, directing circumferential clamping force along the groove wall within the relatively restricted space of the groove. In this manner a snap-ring may restrict or minimize any undesirable lateral or axial motion between two or more mating parts, such as within a flange or flanges of a clutch hub and a mating drum within a transmission clutch assembly.

The insertion and removal of a snap-ring during the transmission assembly or build process may be relatively time or material intensive due to the difficulty of accessing various confined areas within the housing. For instance, a person installing a snap-ring must often insert or place the ring into an area having limited accessibility or installation clearance, while simultaneously exerting a substantial amount of force on the curvilinear beams of the snap-ring in order to open or close the ring. The space and force limitations may be considerable enough to necessitate the use of special-purpose capital equipment, potentially adding substantial cost to the assembly process. Additionally, the requisite strength or rigidity for higher-load applications may require a snap-ring formed from a proportionately thicker layer of material, which in turn may lead to an undesirable increase in overall axial space within a transmission case or other housing, resulting in the need for a larger case and/or the re-arrangement of other components within the system.

SUMMARY OF THE INVENTION

Accordingly, an improved retaining device is provided having a primary or main loop, a variable-width or compressible opening dividing the main loop into adjoining curvilinear beams or portions operable to exert a circumferential force when inserted into a mating groove or channel, and an additional minor or secondary loop connecting the curvilinear portions, and operable to modify the deflection or compressive force required to compress or deflect the curvilinear portions.

In one aspect of the invention, the opening comprises a plurality of generally parallel tabular extensions, each extension having sufficient surface area for applying compressive force to the main loop for flexing or bending of the curvilinear portions to facilitate installation of the retaining device. The tabular extensions are further configured to prevent rotation of the snap-ring within the mating circumferential groove.

In another aspect of the invention, a retaining device having an improved compressive or deflection force is provided in which an externally-projecting secondary loop reduces the compressive force required to compress or deflect the curvilinear portions of the main loop, thereby facilitating the installation of the retaining device.

In another aspect of the invention, a retaining device having improved rigidity is provided in which an internally-projecting secondary loop increases the compressive or deflection force required to compress or deflect the curvilinear portions of the main loop, thereby providing increased rigidity to the main loop.

In another aspect of the invention, a circular flange assembly is provided for use within a vehicle transmission, in which a substantially annular retaining device having a main loop and a minor secondary loop is inserted into continuous circumferential or peripheral groove in a flange wall, the main loop having a plurality of tabular extensions configured to prevent rotation of the main loop within the circumferential or peripheral groove.

In another aspect of the invention, a clutch assembly is provided for use within a vehicle transmission, in which an improved snap-ring retaining device is insertable in the mating grooves of a dual-flanged clutch hub and mating clutch drum to thereby retain the clutch hub and drum.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1A:
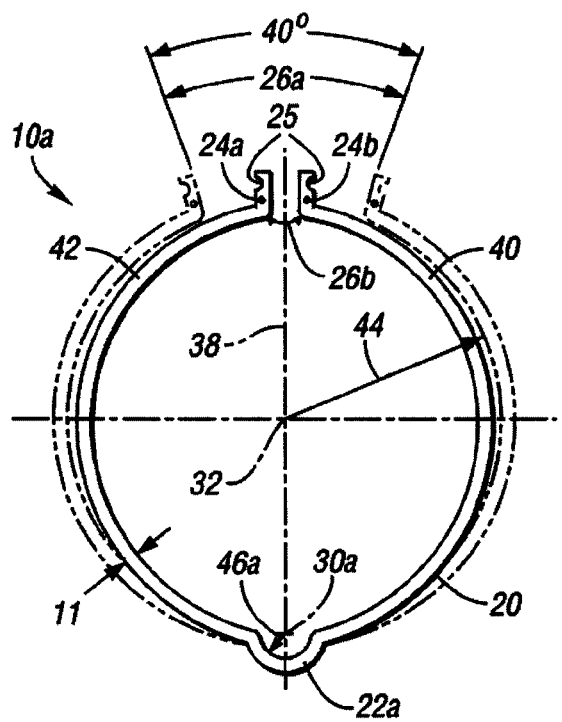
FIG. 1A is a plan view of an improved snap-ring according to the invention having an outwardly-projecting secondary loop.

Referring to the drawings wherein like reference numbers correspond to like or similar components throughout the several figures, there is shown in FIG. 1A a substantially annular or circular snap-ring 10a comprising a primary or main loop 20 having a width 11 and configured by a main radius 44 drawn from a main center point 32. An outwardly-projecting minor or secondary extend loop 22a, preferably circular in shape, is configured by a secondary radius 46a drawn from a secondary center point 30a, the extend loop 22a projecting radially outward from the circular periphery of main loop 20. A pair of tabular extensions or tabs 24a, 24b, preferably aligned in a substantially parallel manner and positioned approximately 180° opposite secondary loop 22a, define a normal unflexed or "free state" break or opening 26a in main loop 20. The unflexed opening 26a is represented by the phantom or dotted-line profile in FIG. 1A. Center points 30a, 32 are preferably aligned along a main loop axis 38 bisecting main loop 20 and secondary extend loop 22a. Thus, main loop 20 has a first and second curvilinear beam portion 40, 42 being at least partially flexible, compressible, or deflectable, by actuating tabs 24a, 24b disposed at the end of portions 40, 42, respectively. When curvilinear portions 40, 42 are deflected by the application of a contracting clamping force to tabs 24a, 24b, a reduced-width or compressed opening 26b results, as shown by the solid line in FIG. 1A.

In a preferred embodiment, main radius 44 and secondary radius 46a are proportionately related by a ratio of approximately 25:1, with compressed opening 26b, when substantially flexed or compressed, having a width approximately 0 to 5% of main radius 44. When curvilinear portions 40, 42 are in a "free state", i.e. undeflected or unflexed, tabs 24a, 24b preferably form an unflexed opening 26a, as shown by the phantom line in FIG. 1A, with a relative angle of approximately 40° between tabs 24a, 24b, although those skilled in the art will recognize that other deflection angles and loop ratios may be adapted and modified as necessary depending on the application. Tabs 24a, 24b are further preferably configured with a notch or series of notches 25 being sized and/or shaped to fit a ring compression tool (not shown), such as a pair of pliers, for assisting in compressing and inserting ring 10a into, for example, a flange groove in the wall of a clutch housing.

Figure 2A:
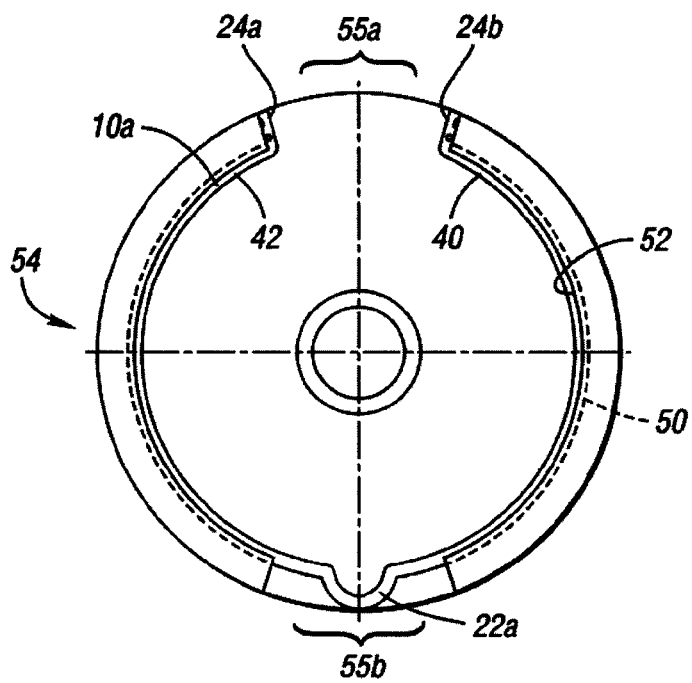
FIG. 2A is a plan view of a clutch drum in combination with an improved internal snap-ring.

Turning to FIG. 2A, a circular drum 54, depicted herein as a representative clutch drum, is shown with a captive snap-ring 10a as described hereinabove. Snap-ring 10a is inserted into a channel or peripheral flange groove 50 positioned along the inner circumferential or peripheral surface 52 of the drum 54, the groove represented in FIG. 2A as a dotted line. A first window or slot 55a is positioned at one end of drum 54 generally opposite secondary loop 22a, slot 55a being appropriately sized to accept the elastically-deflectable tabs 24a, 24b of snap-ring 10a to prevent relative rotation or spin of the snap-ring 10a within the flange groove 50. To obtain the rotational balance as well as to accommodate insertion and flexing of secondary outer loop 22a, the bottom or opposite end of the drum 54 likewise has a substantially similar and preferably identical slot 55b positioned approximately 180° opposite slot 55a. Once compressed or deflected and inserted into flange groove 50, and subsequently released, snap-ring 10a returns to a position short of "free state" or unflexed opening 26a (See FIG. 1A), and so exerts a continuous outward circumferential clamping force along the surface of groove 50, thereby providing axial support and noise reduction between the mating parts, such as, for example, between clutch drum 54 of FIG. 2A and mating clutch hub 62 of FIG. 2B.

Figure 2B:
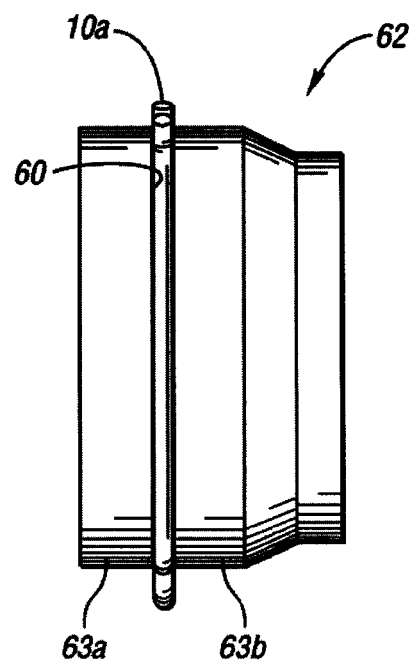
FIG. 2B is a side view of a double-flange clutch hub in combination with an improved snap-ring.

Clutch hub 62 of FIG. 2B has a continuous outer circumferential channel or hub groove 60 disposed between a first and second flange 63a, 63b. Snap-ring 10a is inserted into groove 60 between flanges 63a, 63b and compressed at tabular extensions 24a, 24b (see FIG. 1A) as described previously herewithin. While holding snap-ring 10a in a compressed position, hub 62 is inserted into mating clutch drum 54 (see FIG. 2A). Tabular extensions 24a, 24b are held in compressed position until hub 62 is fully inserted into clutch drum 54. Once the snap ring 10a is aligned with flange groove 50, the tabular extensions 24a, 24b of snap-ring 10a are released, and the snap-ring 10a partially opens or decompresses to at least partially fill mating flange groove 50 (see FIG. 2A) while remaining at least partially within hub groove 60. Tabular extensions 24a, 24b snap into place within slot 55a, thereby preventing relative rotation of the snap ring 10a within grooves 50, 60. For example, in the case of clutch hub 62 of FIG. 2B, the snap-ring 10a would thereby retain the hub and drum, as would any splines on the mating surfaces of clutch drum 54 and hub 62. For simplicity, mating splines are not shown on surface 52 of clutch drum 54 of FIG. 2A or on flanges 63a, 63b of hub 62 of FIG. 2B, which are the respective mating surfaces on which splines could be employed. By utilizing the described double-flange design, the contact area or power density between snap-ring 10a and flanges 63a, 63b is thereby doubled, which may permit the amount and/or type of metal strengthening support components within the transmission component, such as splining, to be reduced in number and/or otherwise modified in appearance.

Figure 1B:
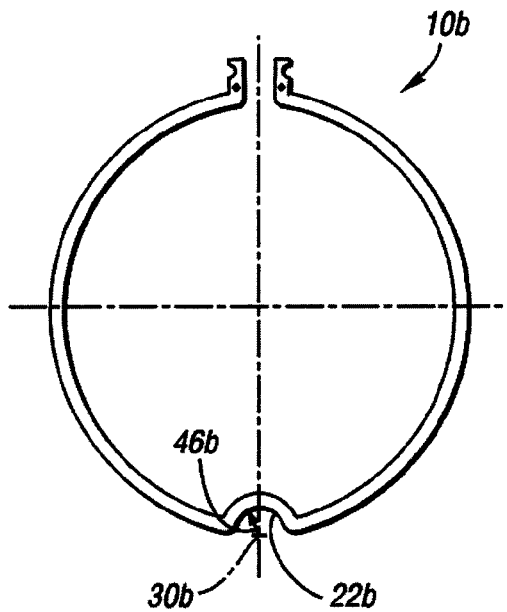
FIG. 1B is a plan view of an improved snap-ring according to the invention having an inwardly-projecting secondary loop.

In an alternative embodiment of FIG. 1B, a snap-ring 10b has an inwardly-projecting minor or secondary inner loop 22b having a center point 30b and a secondary radius 46b. The primary advantages of a secondary inner loop are twofold. First, by positioning a secondary inner loop 22b on the inside of main loop 20, the outer dimension or periphery of snap-ring 10b may be completely hidden within a groove positioned within a circular wall of, for example, a clutch hub. Additionally, in some circumstances installation space may be restricted or limited, and consequentially, a secondary extend loop of the type shown in FIG. 1A may not fit properly within the flange. Second, a secondary inner loop 22b may be used to enhance the rigidity of a snap-ring 10b, as an inwardly-disposed secondary loop requires greater force to achieve a given amount of annular deflection than does an outer-loop design, as discussed hereinbelow.

Figure 3A:
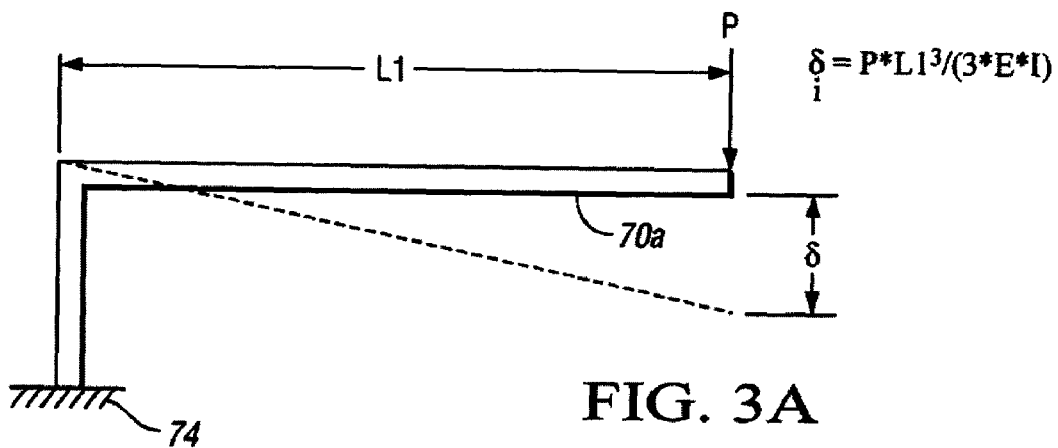
FIG. 3A is a schematic illustration showing a load deflection of a simplified straight or linear beam.

The deflection effect on a main surface due to the addition of a secondary surface of various size and position may be explained by using the simplified linear-beam profile of FIG. 3A in which a straight beam 70a having a length L1 is attached to ground 74 and subjected to an applied load P. In this example, load P imparts to beam 70a a deflection δ, in which $\delta = P*(L1)^3/(3*E*I)$. In this deflection equation, variable E is Young's Modulus, commonly referred to as the modulus of elasticity, with variable I being the moment of inertia. Those skilled in the art will recognize that Young's Modulus E is a material-specific quantity, with a stiffer material providing a reduced magnitude of deflection, while the moment of inertia I varies with the shape of the beam profile.

Figure 3B:
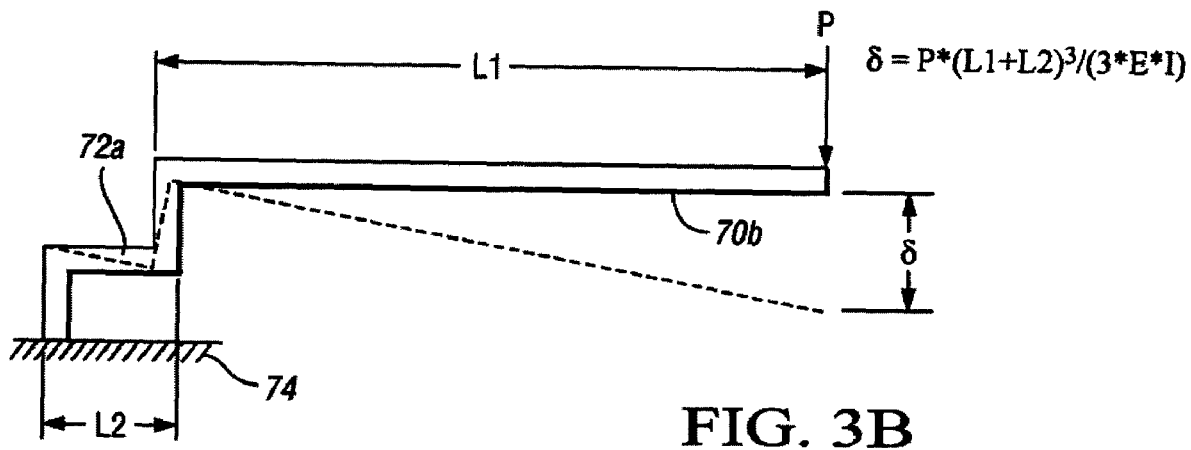
FIG. 3B is a schematic illustration showing an exemplary load deflection of a modified straight beam having the secondary outer loop of this invention.

FIG. 3B modifies the single-beam design by adding an outwardly-disposed minor beam 72a having a length L2. Under this modified configuration, the force-deflection equation is modified to $\delta=P*(L1+L2)^3/(3*E*I)$. That is, the addition of an outwardly-disposed minor-beam 72a increases deflection δ for a given load P. In designing a snap ring according to the invention, deflection can therefore be customized by adapting a specific size and shape for the inner and outer loops, by changing ring material, or by modifying the shape of the ring, as indicated by the force-deflection equations.

Figure 3C:
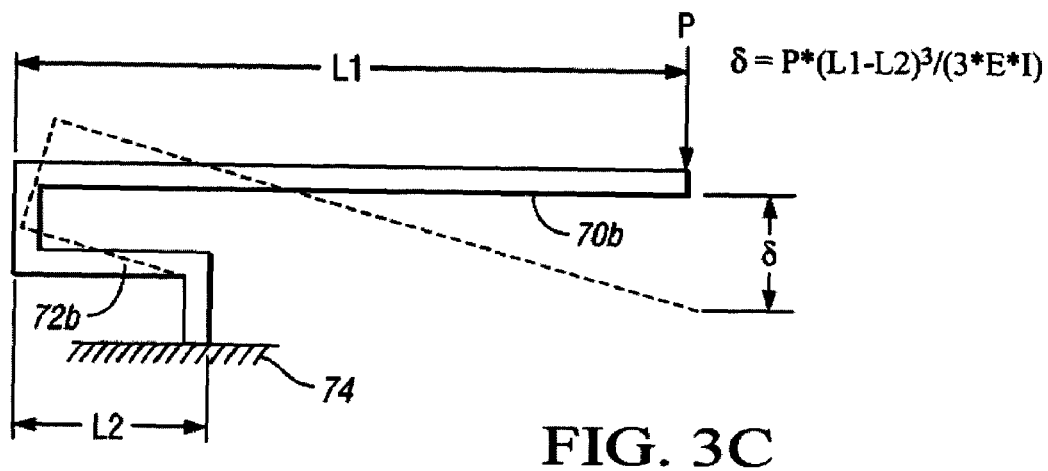
FIG. 3C is a schematic illustration showing a load deflection of a modified straight beam having a secondary inner loop.

By contrast, FIG. 3C shows an inwardly-disposed minor beam 72b having a length L2 equal to length L2 of FIG. 3B. In this example, deflection $\delta=P*(L1-L2)^3/(3*E*I)$. The addition of minor-beam 72b therefore decreases deflection δ for a given load P, that is, 72b imparts stiffness or rigidity to the beam as described previously herewithin. When this deflection effect is applied to a curved beam or a beam of another non-linear shape, such as a snap-ring, the corresponding force-deflection equations consider the radii of the inner and outer loops in determining beam length and linear deflection. Note, however, that the general relationship of inverse proportionality between deflection and both moment of inertia and Young's Modulus, as illustrated in the simplified designs of FIGS. 3A-C, holds true independent of beam shape and can be used by those skilled in the art to design a snap-ring for a given application, in accordance with the teachings of this invention. While the minor beams (secondary loop 22a, 22b of FIGS. 1A, 1B) are preferably circular, they may also take another suitable shape such as an oval or a parabola to further increase or reduce the moment of inertia in the aforementioned manner.

While the best modes for carrying out the invention have been described in detail, those familiar with the art to which this invention relates will recognize various alternative designs and embodiments for practicing the invention within the scope of the appended claims.

The invention claimed is:

1. A clutch assembly for use within a vehicle transmission, the assembly comprising:
    a first and second clutch hub flange having a continuous peripheral hub groove therebetween;
    a clutch drum having a flange wall with a peripheral flange groove; and
    a snap-ring retaining device having a main loop including an opening having a width which is reducable by compression of said main loop, the opening at least partially separating said main loop into a pair of operatively connected curvilinear portions, and a minor secondary loop positioned approximately 180° opposite said opening and directly connecting said pair of operatively connected curvilinear portions, said minor secondary loop being configured for affecting an amount of compressive force required for flexing of said curvilinear portions;
    wherein said clutch hub is insertable into said clutch drum, and wherein said snap-ring retaining device is insertable within both of said hub groove and said flange groove to thereby retain said clutch hub with said clutch drum.

2. The clutch assembly of claim 1, wherein said secondary loop is an internally-projecting inner loop operable to increase the compressive force required to deflect said pair of operatively connected curvilinear portions.

3. The clutch assembly of claim 1, wherein said secondary loop is an externally-projecting extend loop operable to reduce the compressive force required to deflect said pair of operatively connected curvilinear portions.

4. The clutch assembly of claim 1, said clutch drum including a first flange slot and a second flange slot positioned approximately opposite said first slot, wherein said main loop comprises a plurality of tabular extensions at least partially defining said opening and insertable into one of said slots to thereby prevent rotation of said snap-ring within said hub groove and said flange groove.

5. The clutch assembly of claim 4, wherein said minor secondary loop which is insertable into one of said slots to thereby allow flexing motion of said minor secondary loop.

6. The clutch assembly of claim 1, wherein the radius of said main loop and the radius of said secondary loop are proportionately related by a ratio of approximately 25:1.

7. The clutch assembly of claim 1, wherein the width of said opening is approximately 0 to 5% of the main radius of said main loop when said opening is fully compressed.

* * * * *